United States Patent
Shipley et al.

(10) Patent No.: US 8,654,079 B1
(45) Date of Patent: Feb. 18, 2014

(54) INPUTTING DATA INTO A MOBILE DEVICE USING A DYNAMICALLY CONFIGURED NUMBER PAD

(75) Inventors: Trevor Daniel Shipley, Olathe, KS (US); Jeremy Richard Breau, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 481 days.

(21) Appl. No.: 13/011,732

(22) Filed: Jan. 21, 2011

Related U.S. Application Data

(63) Continuation-in-part of application No. 12/617,218, filed on Nov. 12, 2009, now Pat. No. 8,301,200.

(51) Int. Cl.
*G06F 3/02* (2006.01)

(52) U.S. Cl.
USPC ............. 345/168; 345/169; 341/21; 400/427; 379/433.07; 455/556

(58) Field of Classification Search
USPC .................. 345/156, 163, 168, 169, 173; 341/21–23; 379/93.17, 93.18, 93.27, 379/368, 433.01, 433.07; 455/550, 564, 455/566, 575.1, 575.11; 400/472, 489
See application file for complete search history.

(56) References Cited

U.S. PATENT DOCUMENTS

| | | | |
|---|---|---|---|
| 5,507,021 A * | 4/1996 | Siegle | 455/158.4 |
| 8,098,177 B2 * | 1/2012 | Yi et al. | 341/23 |
| 2002/0051525 A1 * | 5/2002 | Chang | 379/93.18 |
| 2003/0169188 A1 * | 9/2003 | Chang | 341/22 |
| 2004/0179663 A1 * | 9/2004 | Chang | 379/93.27 |
| 2006/0279433 A1 * | 12/2006 | Cui et al. | 341/22 |
| 2007/0057822 A1 | 3/2007 | Davies | |
| 2007/0130128 A1 * | 6/2007 | Garg et al. | 707/3 |
| 2008/0001788 A1 * | 1/2008 | Min et al. | 341/23 |
| 2008/0224898 A1 * | 9/2008 | Jin et al. | 341/22 |

OTHER PUBLICATIONS

Donald Melanson; Engadget; Eyes-Free Shell for Android Actually Delivers on its Name; Apr. 2, 2009; 5 pages; http://www.engadget.com/2009/04/03/eyes-free-shell-for-android-actually-delivers-on-its-name.

Notice of Allowance and Fee(s) Due for U.S. Appl. No. 12/617,218, mailed Jun. 14, 2012.

* cited by examiner

*Primary Examiner* — Kimnhung Nguyen

(57) ABSTRACT

Systems, products, and methods are disclosed for facilitating a method of mapping a numerical keypad to keys of a keyboard on a mobile communications device based on an initial selection of an edge key. One embodiment of the method includes receiving input by way of a given key of the keypad and then dynamically configuring that given key to be a numerical key of a numerical keypad. In particular, input received by way of the numerical key is interpreted as a corresponding numeral regardless of a prior configuration associated with the numerical key. Further, keys of a keyboard within a proximity of the numerical key are mapped to remaining numerical keys of the numerical keypad.

20 Claims, 23 Drawing Sheets

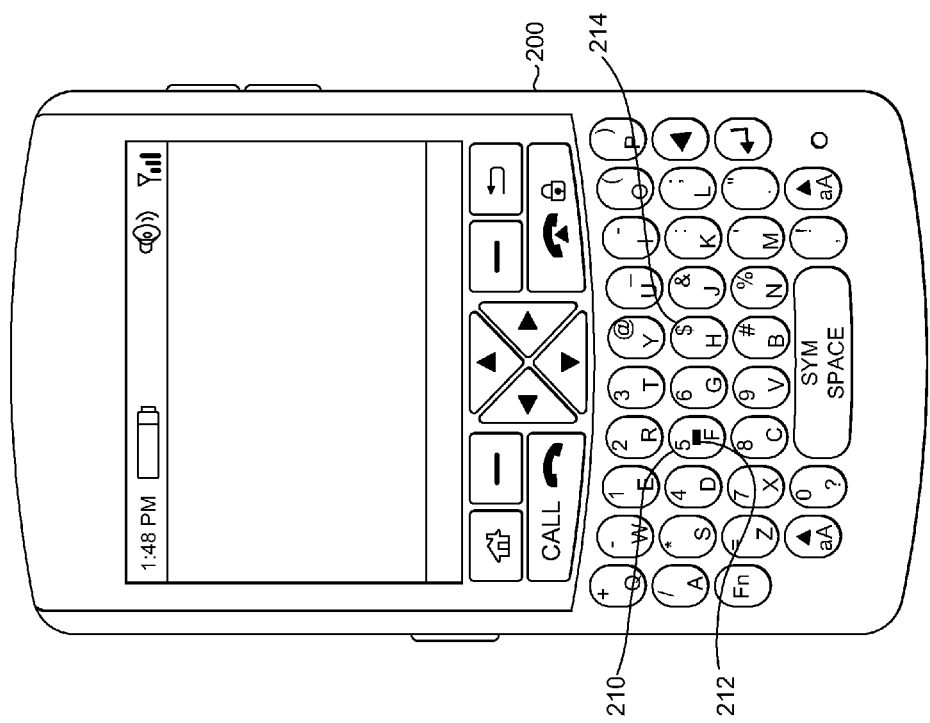
FIG. 2A. – Prior Art

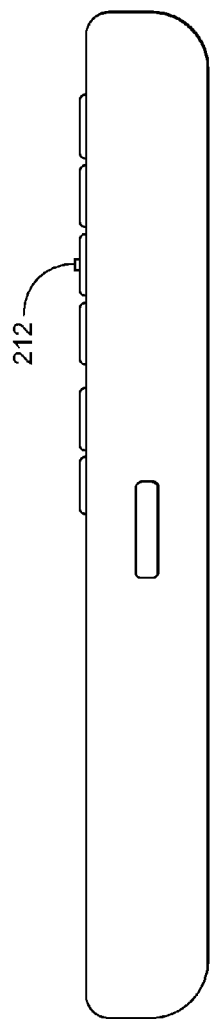
FIG. 2B. – Prior Art
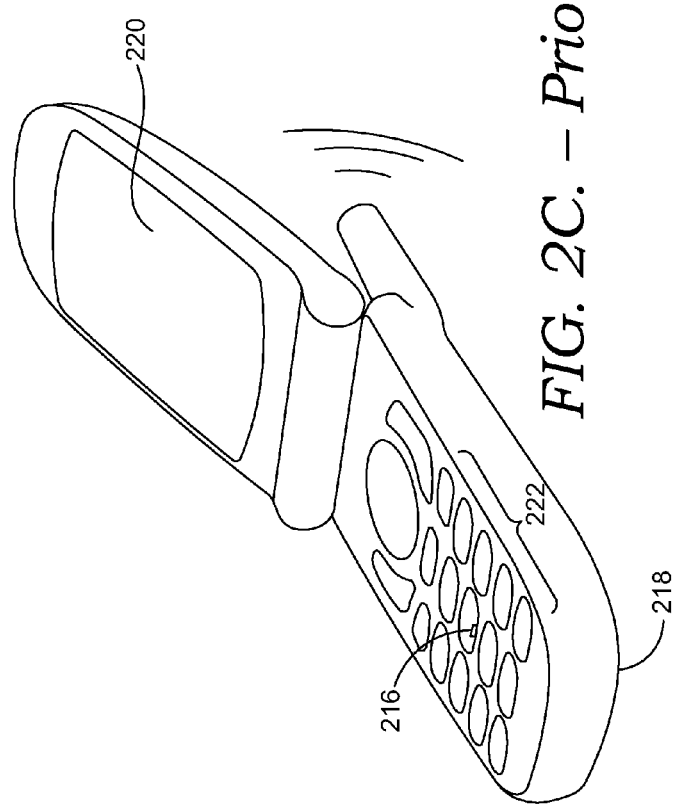
FIG. 2C. – Prior Art

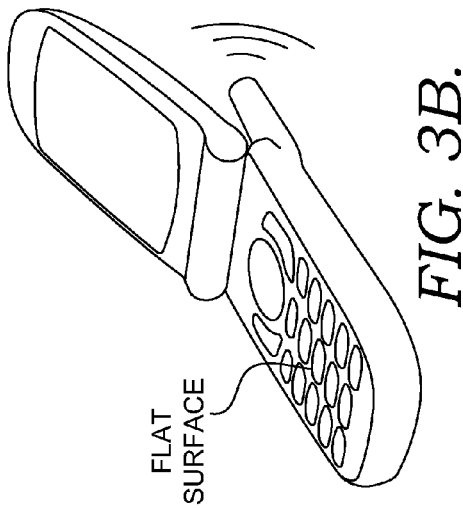
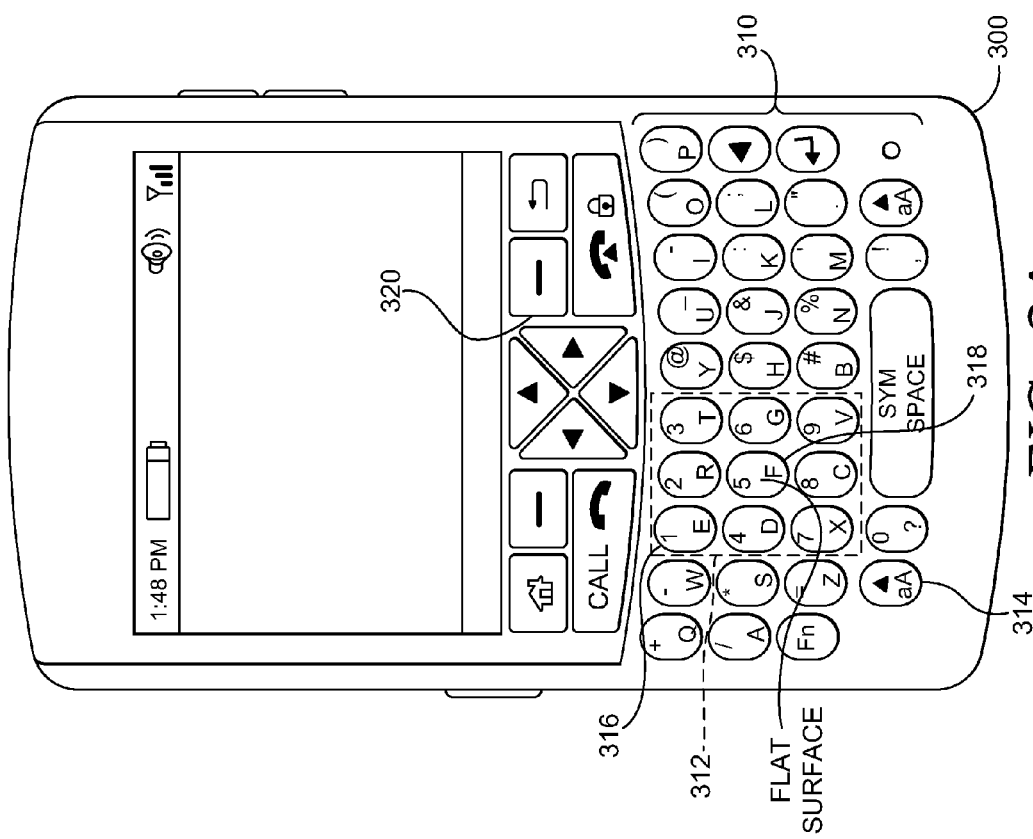
FIG. 3B.
FIG. 3A.

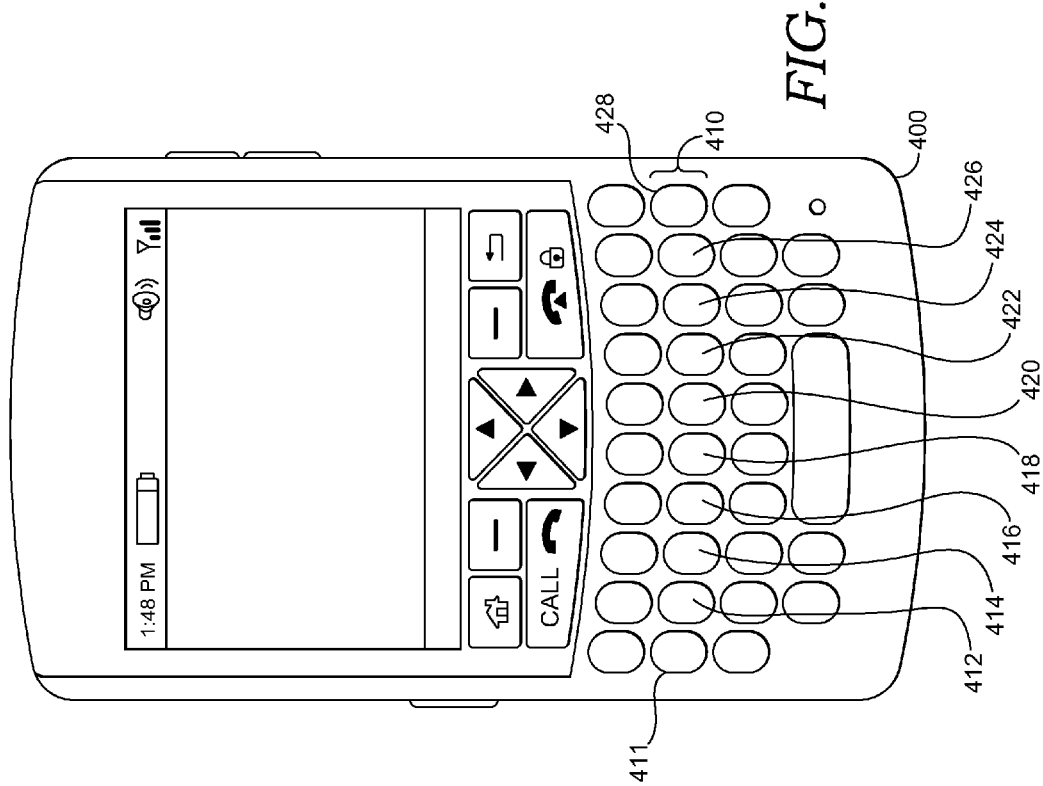

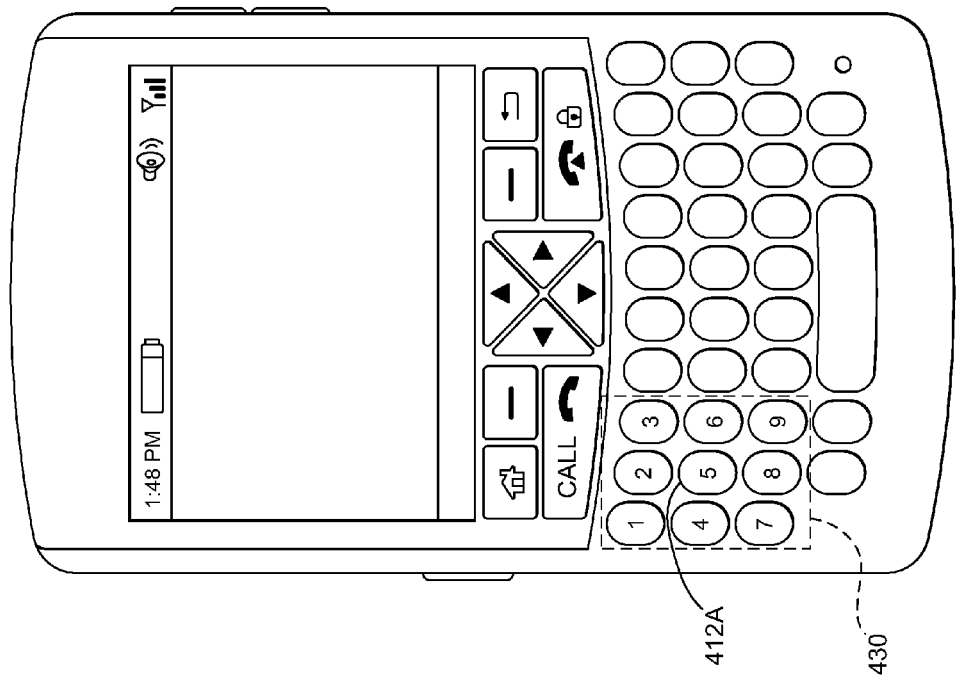

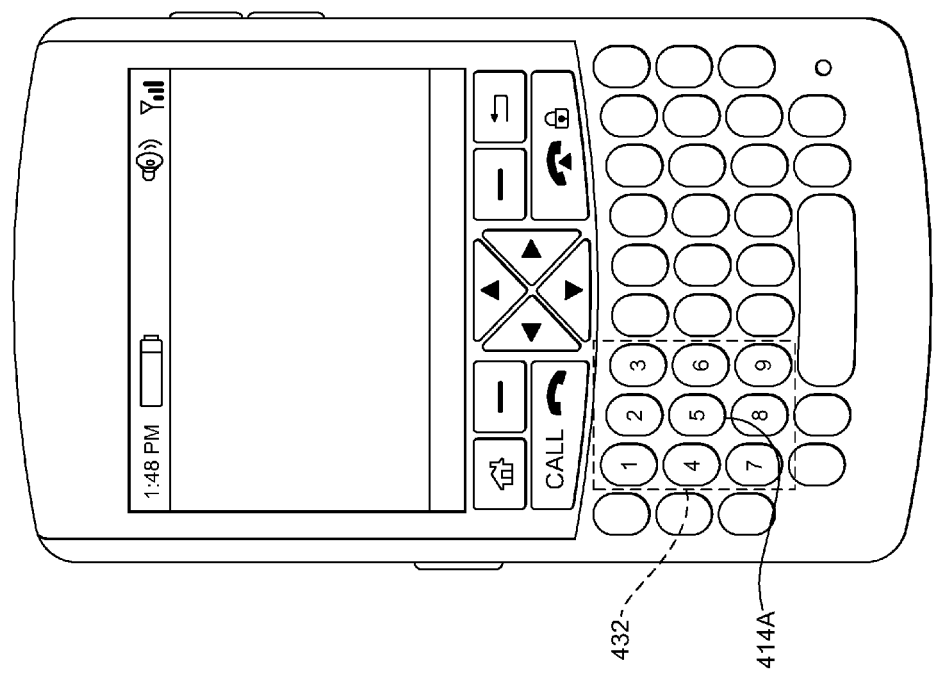

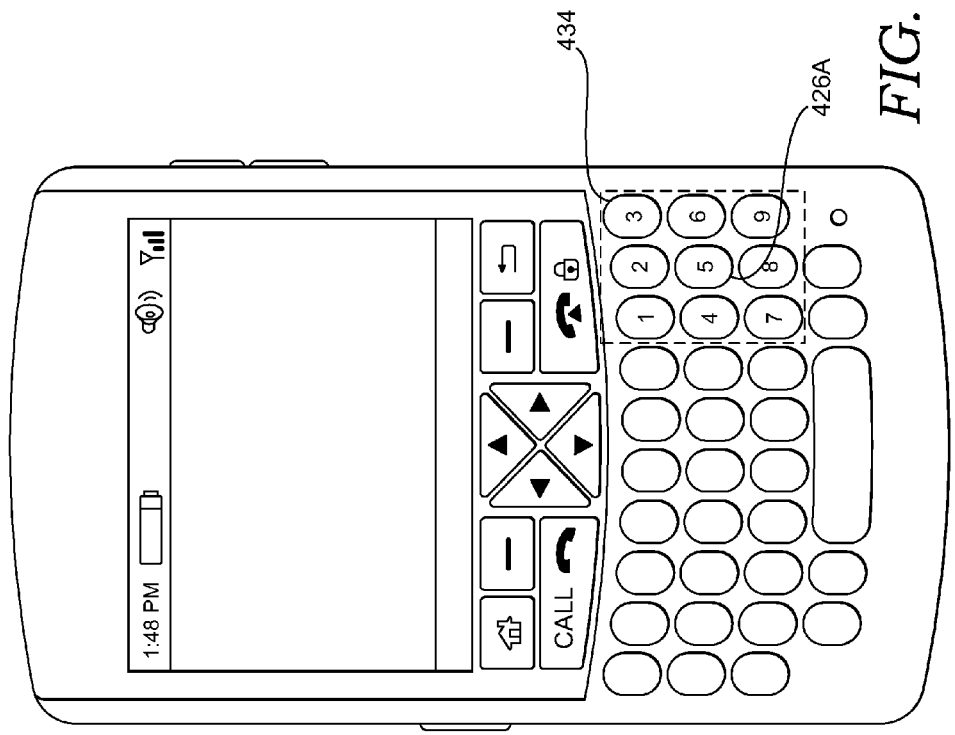

INPUTTING DATA INTO A MOBILE DEVICE USING A DYNAMICALLY CONFIGURED NUMBER PAD

This application is a continuation-in-part of U.S. application Ser. No. 12/617,218, filed Nov. 12, 2009, entitled "INPUTTING DATA INTO A MOBILE DEVICE USING A DYNAMICALLY CONFIGURED NUMBER PAD," which is incorporated herein.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to make inputting data into a mobile communications device easier, especially regarding numerical data. Instead of key values being fixed, a first-pressed edge key becomes a numerical key, such as the "3" key, and then the keys within proximity of the first-pressed edge key become mapped to the remaining "1"-"9" digits of a numerical keypad.

In a first aspect, a set of computer-useable instructions provide a method of mapping numerical values to keys of a keyboard on a mobile communications device. The method comprises receiving input comprising an edge key of the keyboard. The edge key is one of a set of keys that define a perimeter of the keyboard. Additionally, the edge key was associated with a first value prior to receiving the input. The method also comprises determining a position of the edge key. Additionally, the method comprises dynamically mapping numerical values to a certain set of ten keys. In particular, the numerical values "0" through "9" are dynamically mapped to the certain set of ten keys. The numerical values "1" through "9" are mapped to nine keys of the ten keys arranged in a 3×3 matrix. Further, a middle key within the 3×3 matrix is mapped to the numerical value "5" and is surrounded by remaining keys of the 3×3 matrix that are sequentially mapped to values "1" through "9." Additionally, the edge key continues to be an edge key. As such, the edge key is configured to be associated with a second value.

In a second aspect, a set of computer-useable instructions provide a method of mapping numerical values to keys of a keyboard on a mobile communications device. The method comprises receiving input comprising an initially selected edge key of the keyboard. The method also comprises determining a position of the initially selected edge key of the keyboard along a perimeter of the keyboard. Additionally, the method comprises assigning a numerical value of the initially selected edge key of the keyboard based on the position of the initially selected edge key on the keyboard. The method also comprises mapping the initially selected edge key of the keyboard to numerical value of an edge key of a numerical keypad that corresponds to the assigned numerical value of the initially selected edge key. Further, the method comprises assigning each key of a subset of keys of the keyboard a numerical value based on the position of the initially selected edge key. The method also comprises mapping each of the subset of keys of the keyboard to a numerical value of a key of the numerical keypad that corresponds to each assigned numerical value of the subset of keys of the keyboard.

In a third aspect, a set of computer-useable instructions provide a method of mapping numerical values to keys of a keyboard on a mobile communications device. The method comprises receiving input comprising an initially selected edge key of the keyboard. The method comprises assigning a numerical value of the initially selected edge key of the keyboard based on a position of the initially selected edge key of the keyboard along a perimeter of the keyboard. The method also comprises mapping the initially selected edge key of the keyboard to a numerical value of an edge key of a numerical keypad that corresponds to the assigned numerical value of the initially selected edge key. Additionally, the method comprises determining availability of keys of a keyboard within proximity of the position of the initially selected edge key of the keyboard. The method also comprises assigning each key of a subset of keys of the keyboard a numerical value based on the availability of keys of the keyboard. Further, the method comprises mapping each of the subset of keys of the keyboard to a numerical value of a key of the numerical keypad that corresponds to each assigned numerical value of the subset of keys of the keyboard.

BRIEF DESCRIPTION OF THE SEVERAL VIEWS OF THE DRAWINGS

Illustrative embodiments of the present invention are described in detail below with reference to the attached drawing figures, wherein:

FIGS. 2A-2C depict prior-art embodiments of mobile devices that include protrusions on at least one key of a keypad;

FIGS. 3A-3B depict mobile communications devices with no keys that include a protrusion in accordance with an embodiment of the present invention;

FIG. 4 depicts an illustrative row of keys that are available to the "5" keys in accordance with an embodiment of the present invention;

FIGS. 4A-4H depict various possible key remappings or configurations based on first-pressed central keys, in accordance with embodiments of the present invention;

DETAILED DESCRIPTION

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

ASCII American Standard Code for Information Interchange
AFB American Foundation for the Blind
CDMA Code Division Multiple Access
GPRS General Packet Radio Service
GSM Global System for Mobile communications: originally from Groupe Special Mobile
IP Internet Protocol
TDMA Time Division Multiple Access
UMTS Universal Mobile Telecommunications System Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
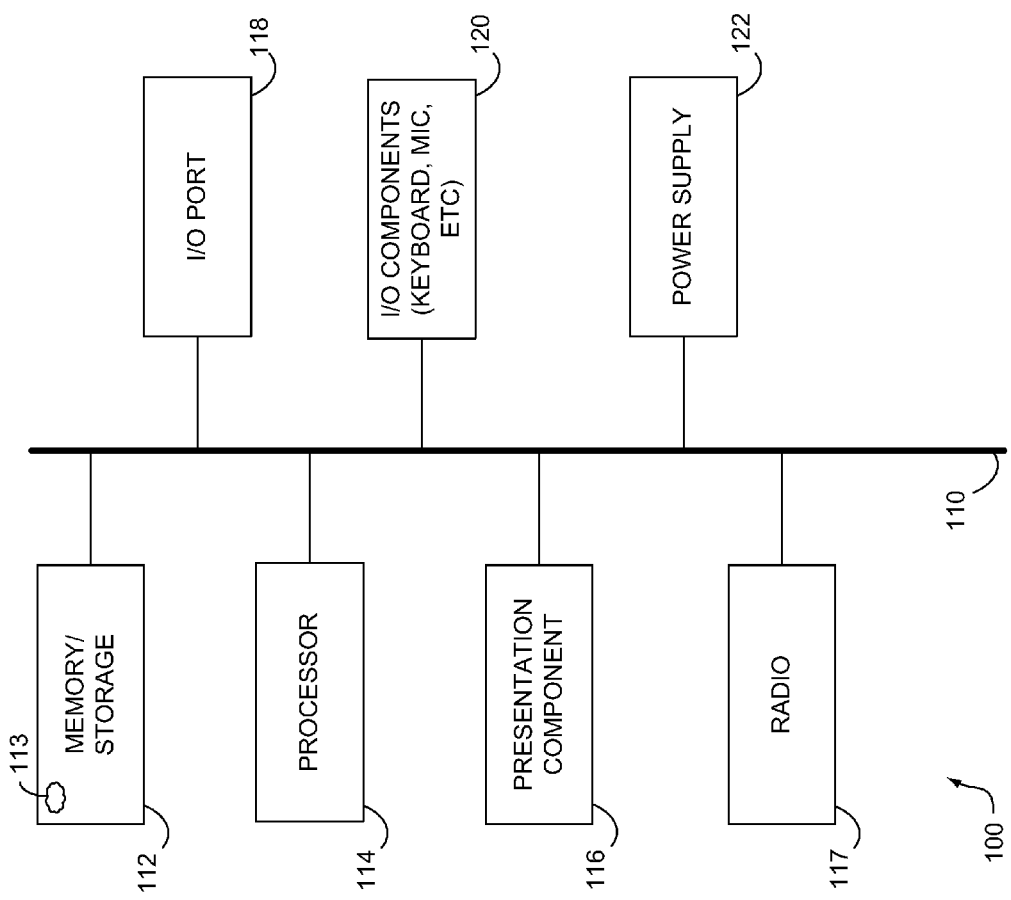
FIG. 1 depicts an illustrative device suitable for use in connection with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We have previously described various memory components that memory 112 might take the form of. Thus, we will not elaborate more here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like (including what is known in the art as WiMax technology and also Long Term Evolution (LTE). In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 100.

Turning now to FIG. 2A, an illustrative prior-art mobile device is provided and referenced generally by the numeral 200. In such a device, a "5" key 210 includes a nub 212 that makes finding the "5" key easier. In some cases, individuals with visual impairments are able to locate the "5" key 210 because of the presence of the nub 212, which protrudes upward and outward from the "5" key itself. Sometimes, other keys include such a nub. For example, the "H" key 214 might also include a nub (not shown). Nub 212 is also shown from a side perspective on FIG. 2B, which is also prior art. Similarly, a nub 216 (FIG. 2C) is common on clamshell-type phones, including phone 218.

Although there are advantages to including a nub on the "5" key to help locate it, there are also drawbacks. For example, some people have a hard time actually finding or feeling the nub. Sometimes the nub scratches a screen, such as screen 220 of FIG. 2C, when it is collapsed onto keyboard 222. Moreover, sometimes the protrusion can lead to the key being inadvertently pressed.

But, as mentioned, being able to locate the "5" key is desirable because once the "5" key is located people know how to locate the other keys. Digits "1" through "9" surround the "5" key and are generally contiguous to it; meaning that even if they do not necessarily touch the "5" key, there are no other keys in between the "5" key and each of the other eight keys, being associated with Arabic numerals "1" through "9."

Turning now to FIG. 3A, a mobile device is depicted in accordance with an embodiment of the present invention and is generally referred to by the numeral 300. Mobile device 300 includes a set of physically-depressible keys 310, which in one embodiment includes all of the letters of the English alphabet. In other embodiments, letters of other alphabets are included. A subset of keys 312 is operable to convey numeric data to mobile device 300. As shown, the subset of keys 312 includes keys that have an ability to convey Arabic numerals "1"-"9" to mobile communications device 300. Sometimes this requires pressing a "shift" key 314 or some other key that when pressed triggers the input of numeric instead of alphabetic data. The "5" key of mobile device 300 has a flat surface with no protrusion that protrudes upward and outward from the surface. If device 300 were of the clamshell type; that is, hinged as shown in FIG. 3B, then it too would have a flat surface on the "5" as well as every other key.

Keyboard 310 includes multiple rows of keys. In the example shown, it includes four rows. Each key is often referred to by letter or number. For example, reference numeral 316 is directed to the "1" key. When we refer to the "1" key, we mean that when that key is pressed, mobile device 300 receives as input an Arabic numeral "1." Similarly, when the number "2" key is pressed, mobile device 300 receives as input the Arabic numeral "2." This would be the case even if the keys were not marked. Just because key 316 bears the marking of a "1" does not mean that it must always convey an Arabic numeral "1" according to our technology. Our technology contemplates that the same physical key is usable to convey different data. That is, computer-executable instructions 113 in combination with processor 114 and other elements work together to map certain keys to certain inputted data based on an initial selection of a "5" key. We will begin explaining this in greater detail with reference to FIG. 4.

Turning now to FIG. 4, a device 400 includes a row 410 of keys. Device 400 is given a separate number so as to make referring to it easier, but it can be the same or identical device as that of FIG. 3A. Row 410 includes a left-most key 411 as well as other keys that are indicated by reference numerals 412, 414, 416, 418, 420, 422, 424, 426, and finally a right-most key 428. According to an embodiment of our technology, each of keys 412-426 can be a "5" key.

That is, any of the keys 412-426 can, when pressed, convey an Arabic numeral "5" to the mobile device. Whichever of keys 412-426 are pressed, that key becomes the "5" key. For example, if a person were to select key 412 first, then, according to our technology, it would become the "5" key and the other keys surrounding it would become mapped to Arabic numerals "1"-"9." This example is shown in FIG. 4A. FIG. 4A depicts a set of keys 430 in which the "5" key 412A is in the middle and the other keys "1"-"9" are arranged around and contiguous with the "5" key. To restate this, reconsider FIG. 2A, in which the "5" key 210 is fixed. In that case, whenever key 210 is pressed the numeral "5" will be conveyed to mobile device 200. But according to embodiments of our technology, the mobile device can be placed into a mode such that whenever a key of row 410 is pressed, the pressing of that key indicates that that key is to be the "5" key. The other numerals are then mapped according to the pressing of the first key. We have already illustrated one example in connection with the pressing of key 412 (FIG. 4A).

If key 414 were pressed initially, then this would cause a portion of the keys of the keyboard to be configured in a specific configuration, which is illustratively shown in FIG. 4B.

FIG. 4B indicates that a set of keys 432 will, when pressed, convey the numerals "1"-"9" with the "5" key being in the center, which is indicated by reference numeral 414A (note that this is in the same position of key 414 of FIG. 4). The markings of the keys in set 432 are for informational purposes. Unless the markings themselves were dynamically configurable, the actual markings of FIG. 3A would remain the same. But this would not be relevant to a person who was handling the device without looking at the keys. For example, perhaps a person is handling the device while not looking at it or while the device cannot be seen. Examples of this include people with visual impairments or any number of situations when a person is operating the device without looking at the keypad.

All the person needs to know is which key was initially pressed. That key becomes the "5" key. The keys immediately around it become the numerals "1"-"9" except for "5," which is already the center key. In this way, a person no longer needs to find a single key as being the "5" key. Rather, any key of an appropriate row can become the "5" key when depressed. We have already shown two examples. Other examples are also shown.

Figure 4C:
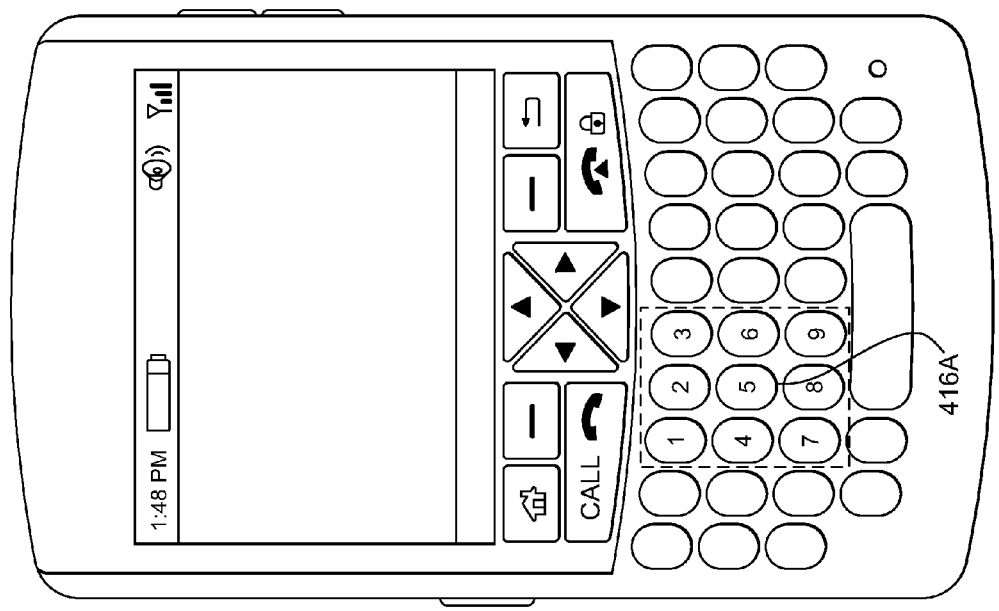
Figure 4D:
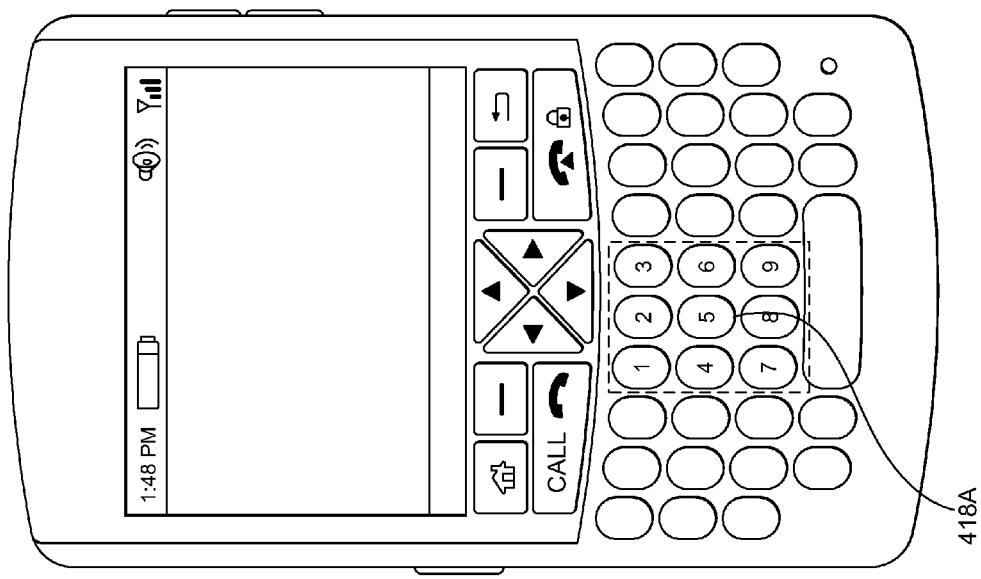
Figure 4E:
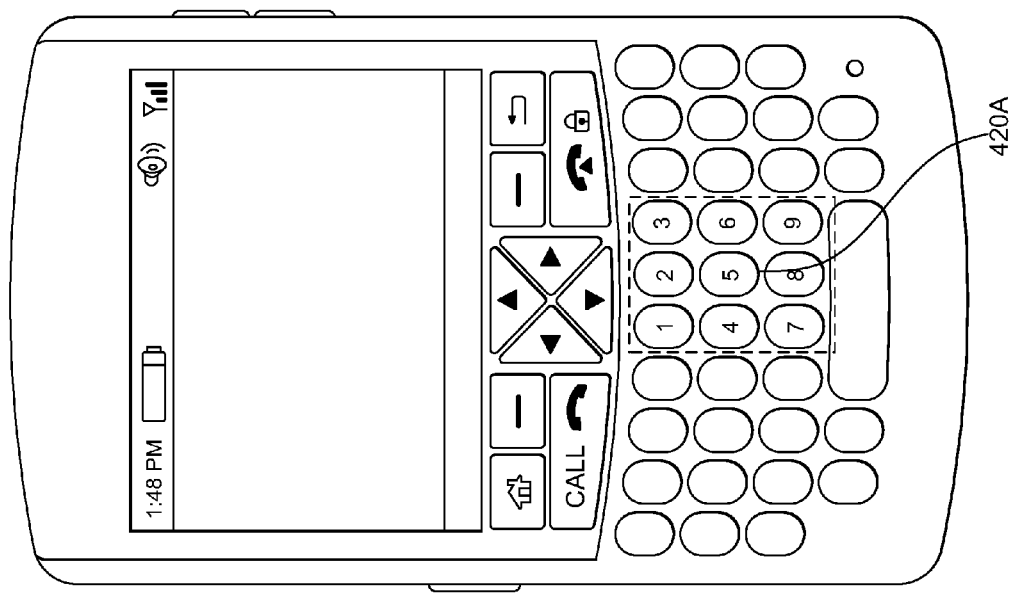
Figure 4F:
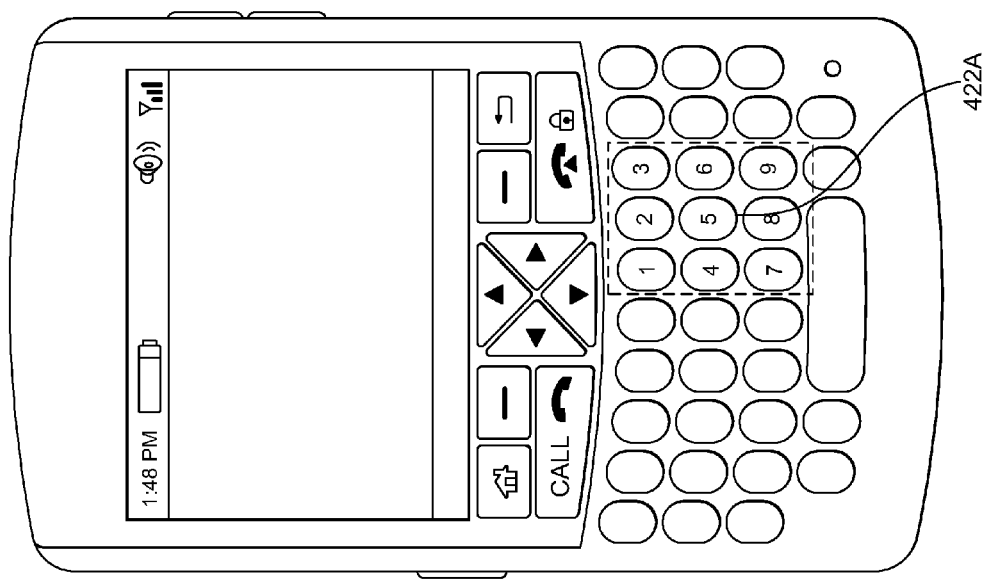
Figure 4G:
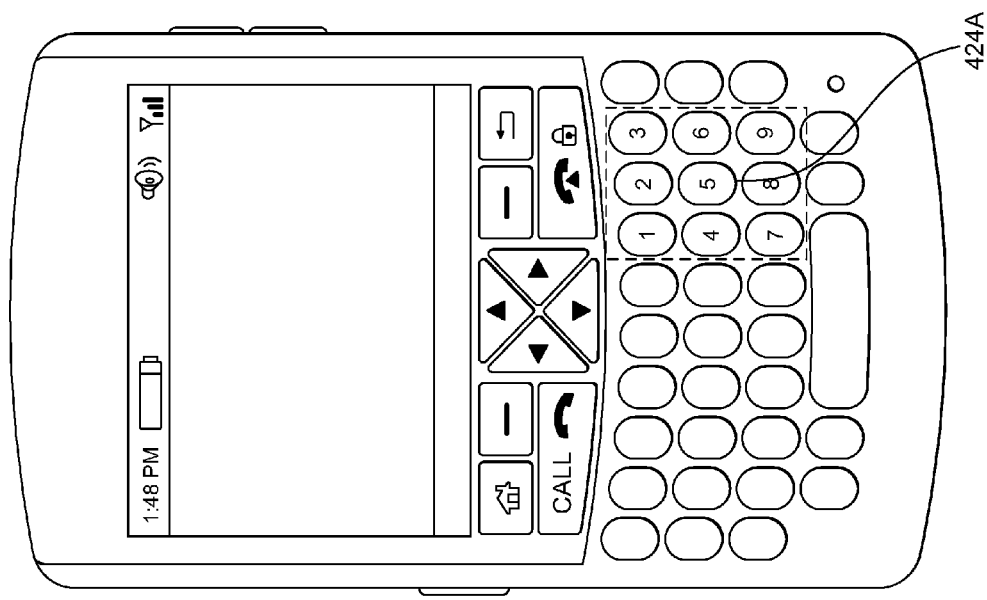

For example, FIG. 4C indicates a mapping in which key 416 is initially depressed. In that embodiment, the keys are dynamically configured to reflect the value shown in FIG. 4C, in which key 416A becomes the "5" key. When key 418 is depressed, the configuration of FIG. 4D is implemented. When key 420 is depressed, a configuration as shown in FIG. 4E is created in which key 420A is the "5" key. When key 422 is pressed, a configuration as shown in FIG. 4F is effected by application 113, in which key 422A is the "5" key. In all of the configurations, the remaining digits "1"-"9" are mapped to the keys surrounding the configured "5" key. Thus, when key 424 is initially pressed, then a configuration as shown in FIG. 4G is created in which key 424A is the "5" key. Finally, if key 426 is pressed, then a configuration as shown in FIG. 4H is created in which key 426A is the "5" key.

While FIGS. 4A-4H discuss embodiments where non-edge keys of a keyboard may be mapped to numerical values of a set of numerical keys, edge keys of a keyboard may also be mapped to numerical values of a set of numerical keys. Edge keys comprise a plurality of keys that are positioned along a perimeter of a keyboard. Further, edge keys of a keyboard may be mapped to numerical values of a set of numerical keys comprising a numerical keypad. In particular, edge keys may be mapped to numerical values based on identifying an edge key of the plurality of edge keys.

In embodiments where a set of numerical keys comprise a 3×3 set of keys identified as "1"-"2"-"3" on a first row, "4"-"5"-"6" on a second row directly below the first row, and "7"-"8"-"9" on a third row directly below the second row, each numerical key "1"-"9" may be an edge key except numerical key "5." Accordingly, each numerical key "1"-"4" and "6"-"9" may be mapped to an edge key of a keyboard based on position of the edge key. As such, embodiments are disclosed for mapping edge keys of a keyboard to numerical values of edge keys of a numerical keypad based on the position of the edge keys relative to other keys on the keyboard.

Figure 5:
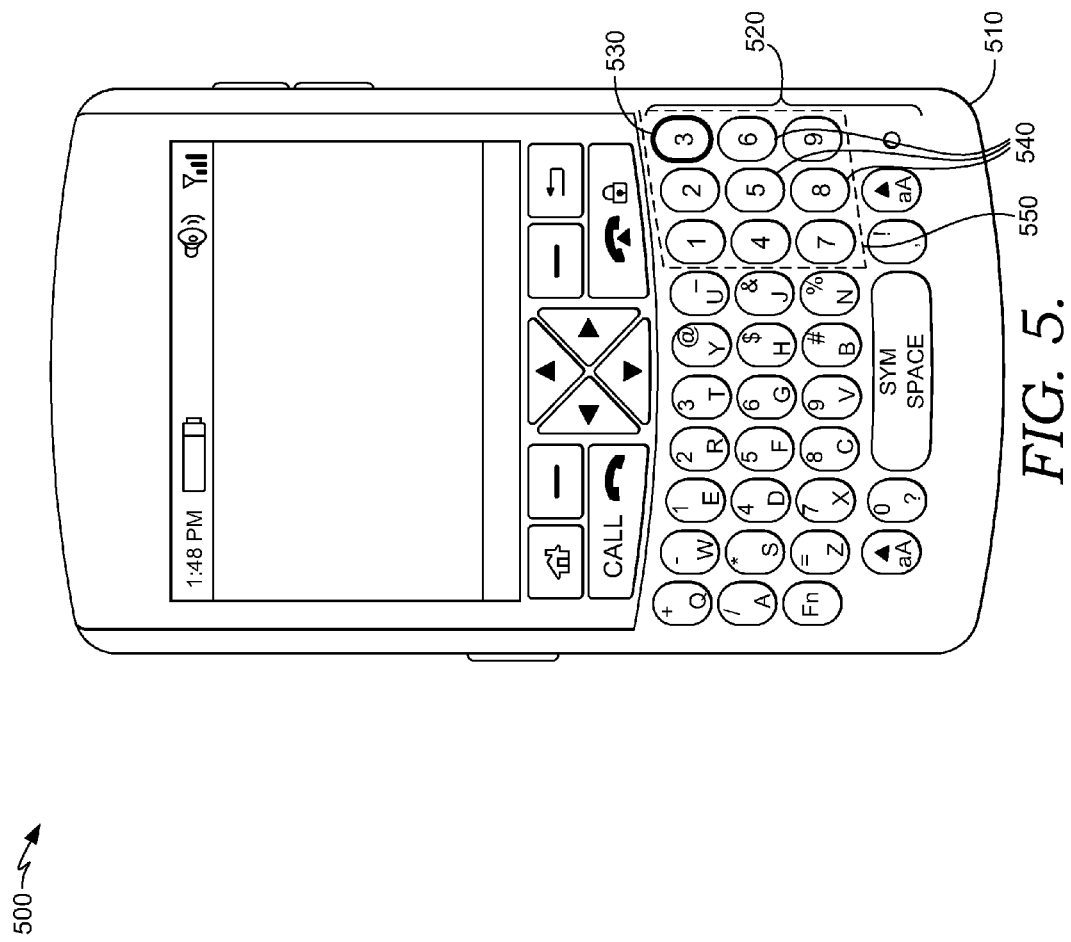
FIG. 5 illustrates a mapping of a portion of keyboard keys to a numerical keypad of a mobile device based on an initially selected upper-right edge key, in accordance with embodiments of the present invention.

Accordingly, FIG. 5 illustrates a mapping 500 of a portion of keyboard keys 520 of a mobile device 510 to a numerical keypad 550 based on an initially selected upper-right edge key 530, in accordance with embodiments of the present invention. Numerical keypad 550 comprises Arabic numerals "1"-"9" arranged consecutively in a 3×3 matrix. Initially selected upper-right edge key 530 is mapped to an upper-right edge key of numerical keypad 550. In particular, upper-right edge key 530 is mapped to reference key "3." Further, keyboard keys 540 within proximity to upper-right edge key 530 may be mapped to numerical reference keys corresponding to numerical keypad 550 based on a position of upper-right edge key 530.

Figure 6:
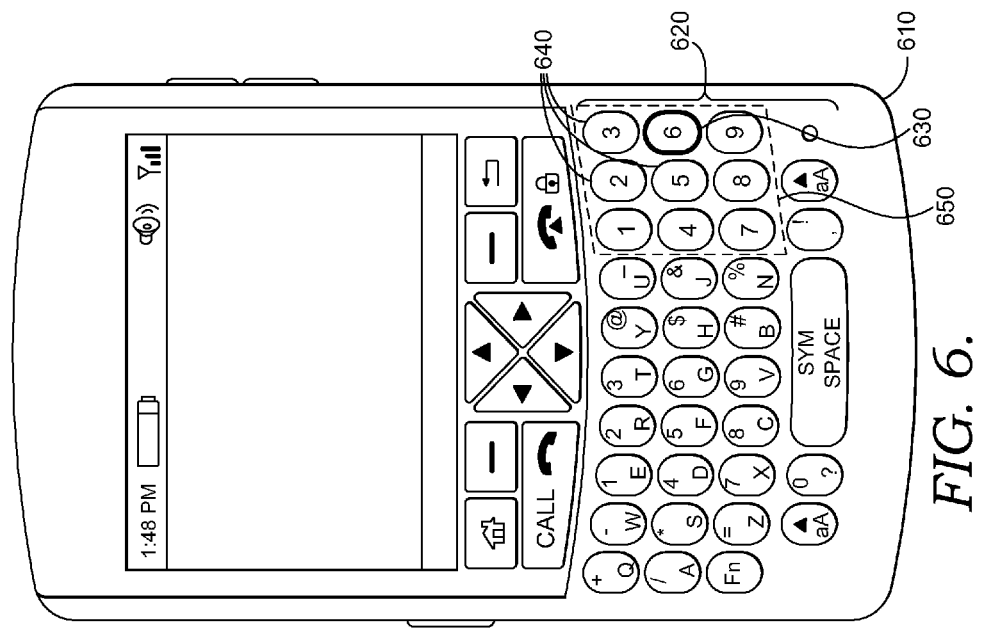
FIG. 6 illustrates a mapping of a portion of keyboard keys to a numerical keypad of a mobile device based on an initially selected right edge key, in accordance with embodiments of the present invention.

FIG. 6 illustrates a mapping 600 of a portion of keyboard keys 620 of a mobile device 610 to a numerical keypad 650 based on an initially selected right edge key 630, in accordance with embodiments of the present invention. Numerical keypad 650 comprises Arabic numerals "1"-"9" arranged consecutively in a 3×3 matrix. Initially selected right edge key 630 is mapped to a right edge key of numerical keypad 650. In particular, right edge key 630 is mapped to reference key "6" based on right edge key 630 having a row of keys available above and below right edge key 630. Further, keyboard keys 640 within proximity to right edge key 630 may be mapped to numerical reference keys corresponding to numerical keypad 650 based on a position of right edge key 630. Alternatively, right edge key 630 may be mapped to reference key "3," as right edge key 630 has a second row of keys below right edge key 630, even though the second row of keys is slightly askew from a column of keyboard 620 that includes right edge key 630.

Figure 7:
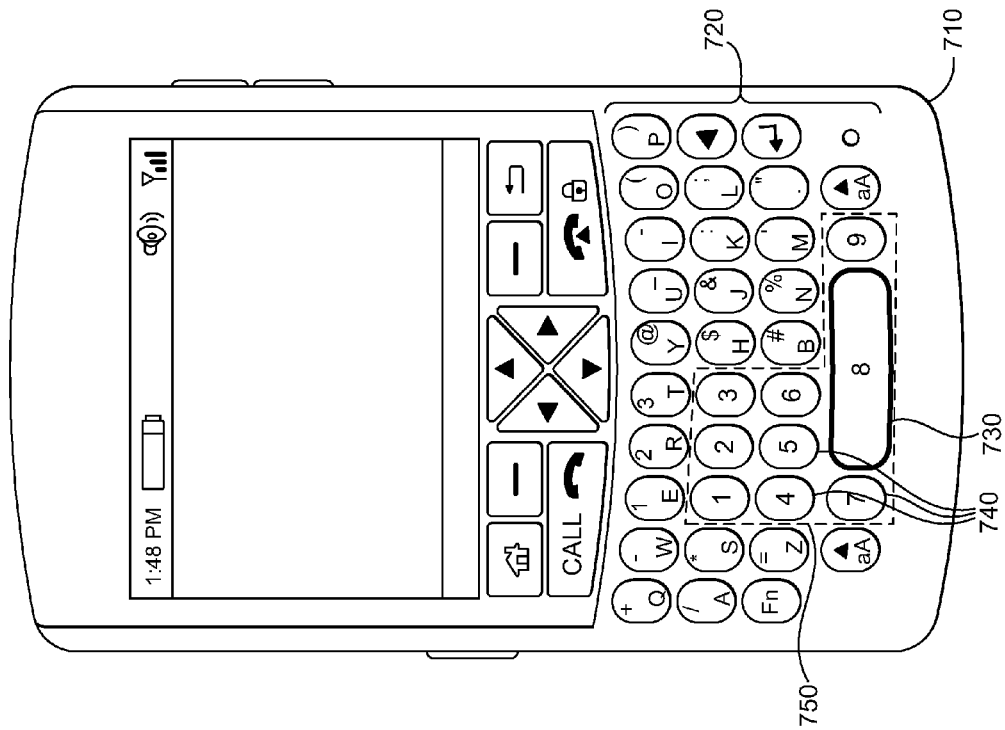
FIG. 7 illustrates a mapping of a portion of keyboard keys to a numerical keypad of a mobile device based on an initially selected bottom edge key, in accordance with embodiments of the present invention.

FIG. 7 illustrates a mapping 700 of a portion of keyboard keys 720 of a mobile device 710 to a numerical keypad 750 based on an initially selected bottom edge key 730, in accordance with embodiments of the present invention. Numerical keypad 750 comprises Arabic numerals "1"-"9" arranged consecutively in a 3×3 matrix. Initially selected bottom edge key 730 is mapped to a bottom edge key of numerical keypad 750. In particular, bottom edge key 730 is mapped to numerical key "8" of the numerical keypad based on bottom edge key 730 having two rows of keys available above bottom edge key 730 and keys available to the right and left of bottom edge key 730. Further, keyboard keys 740 within proximity to bottom edge key 730 may be mapped to numerical reference keys corresponding to numerical keypad 750 based on a position of bottom key 730. In particular, keyboard keys 740 aligned to the left portion of bottom edge key 730 may be mapped to the numerical keypad.

Figure 8:
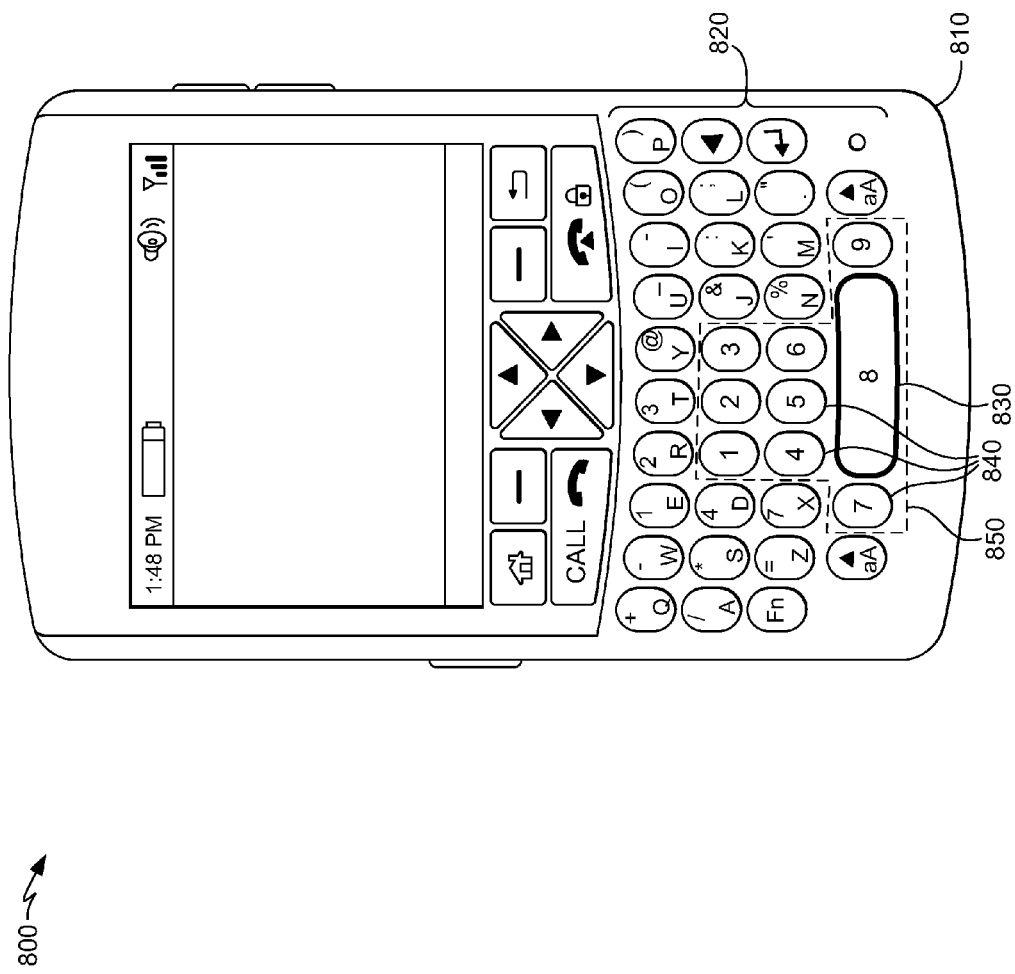
FIG. 8 illustrates another mapping of a portion of keyboard keys to a numerical keypad of a mobile device based on an initially selected bottom edge key, in accordance with embodiments of the present invention.

FIG. 8 illustrates another mapping 800 of a portion of keyboard keys 820 to a numerical keypad 850 of a mobile device 810 based on an initially selected bottom edge key 830, in accordance with embodiments of the present invention. Numerical keypad 850 comprises Arabic numerals "1"-"9" arranged consecutively in a 3×3 matrix. Initially selected bottom edge key 830 is mapped to a bottom edge key of numerical keypad 850. In particular, bottom edge key 830 is mapped to numerical key "8" of the numerical keypad based on bottom edge key 830 having two rows of keys available above bottom edge key 830 and keys available to the right and left of bottom edge key 830. Further, keyboard keys 840 within proximity to bottom edge key 830 may be mapped to numerical reference keys corresponding to numerical keypad 850 based on a position of bottom key 830. In particular, keyboard keys 840 aligned above bottom edge key 830 may be mapped to the numerical keypad.

Figure 9:
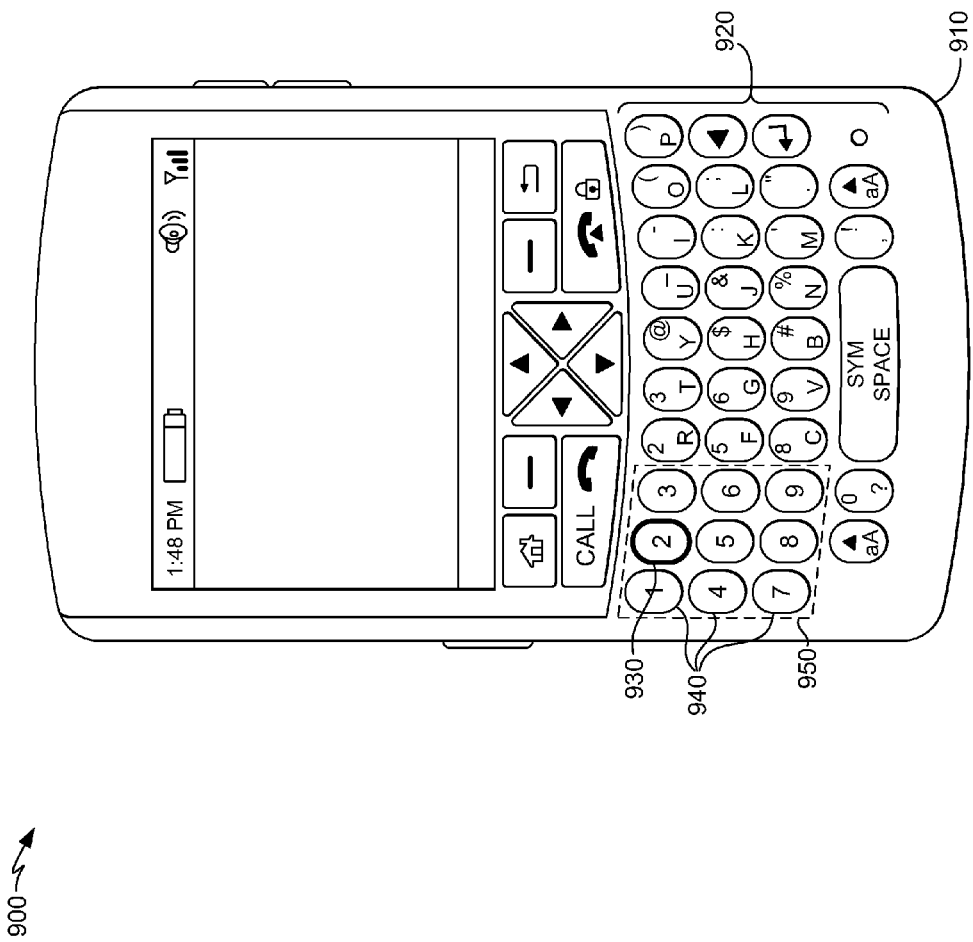
FIG. 9 illustrates a mapping of a portion of keyboard keys to a numerical keypad of a mobile device based on an initially selected upper edge key, in accordance with embodiments of the present invention.

FIG. 9 illustrates a mapping 900 of a portion of keyboard keys 920 of mobile device 910 to a numerical keypad 950 of a mobile device 910 based on an initially selected upper edge key 930, in accordance with embodiments of the present invention. Numerical keypad 850 comprises Arabic numerals "1"-"9" arranged consecutively in a 3×3 matrix. Initially selected upper edge key 930 is mapped to an upper edge key of numerical keypad 950. In particular, upper edge key 930 is mapped to reference key "2." Further, keyboard keys 940 within proximity to upper edge key 930 may be mapped to numerical reference keys corresponding to numerical keypad 950 based on a position of upper edge key 930.

Figure 10:
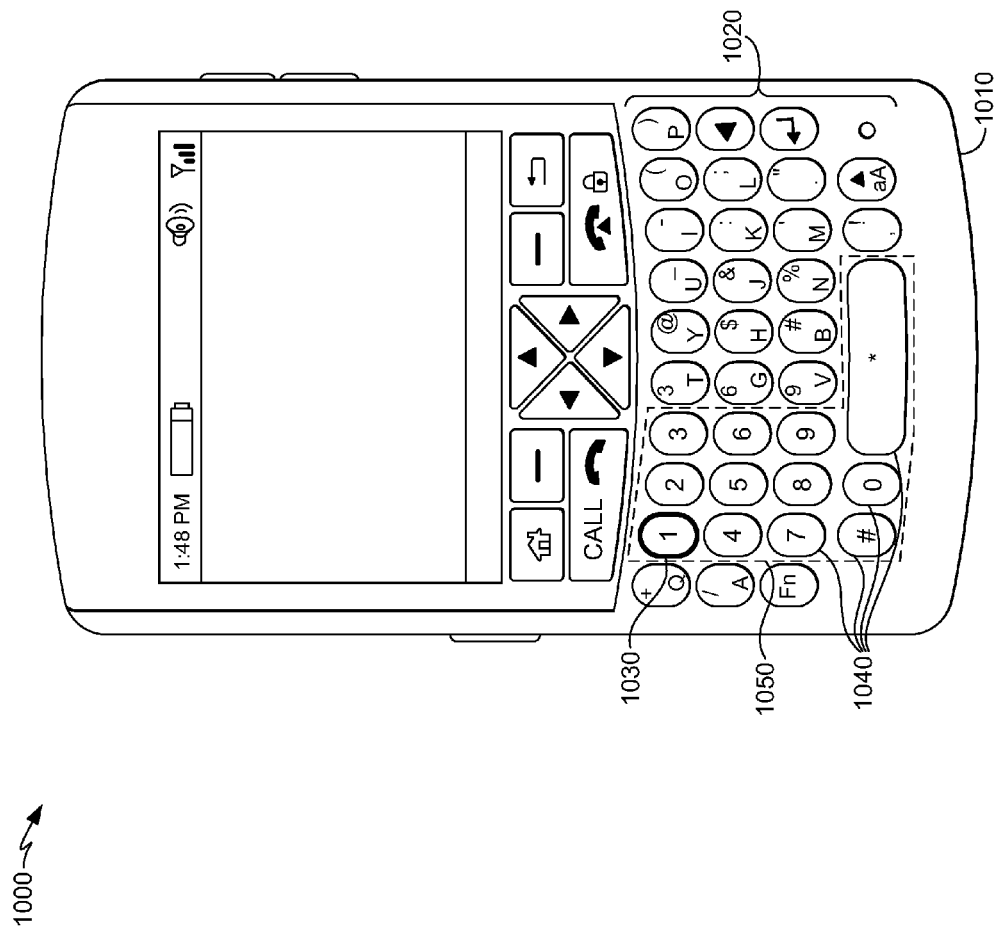
FIG. 10 illustrates a four-row mapping of a portion of keyboard keys to a numerical keypad of a mobile device based on an initially selected upper edge key, in accordance with embodiments of the present invention.

FIG. 10 illustrates a four-row mapping 1000 of a portion of keyboard keys 1020 of a mobile device 1010 to a numerical keypad 1050 based on an initially selected upper edge key 1030, in accordance with embodiments of the present invention. Numerical keypad 1050 comprises Arabic numerals "0"-"9", a pound key, and a star key arranged in a 4×3 matrix. Initially selected upper edge key 1030 is mapped to an upper edge key of numerical keypad 1050. In particular, upper edge key 1030 is mapped to reference key "1." Further, keyboard keys 1040 within proximity to upper edge key 1030 may be mapped to numerical reference keys corresponding to numerical keypad 1050 based on a position of upper edge key 1030.

Figure 11:
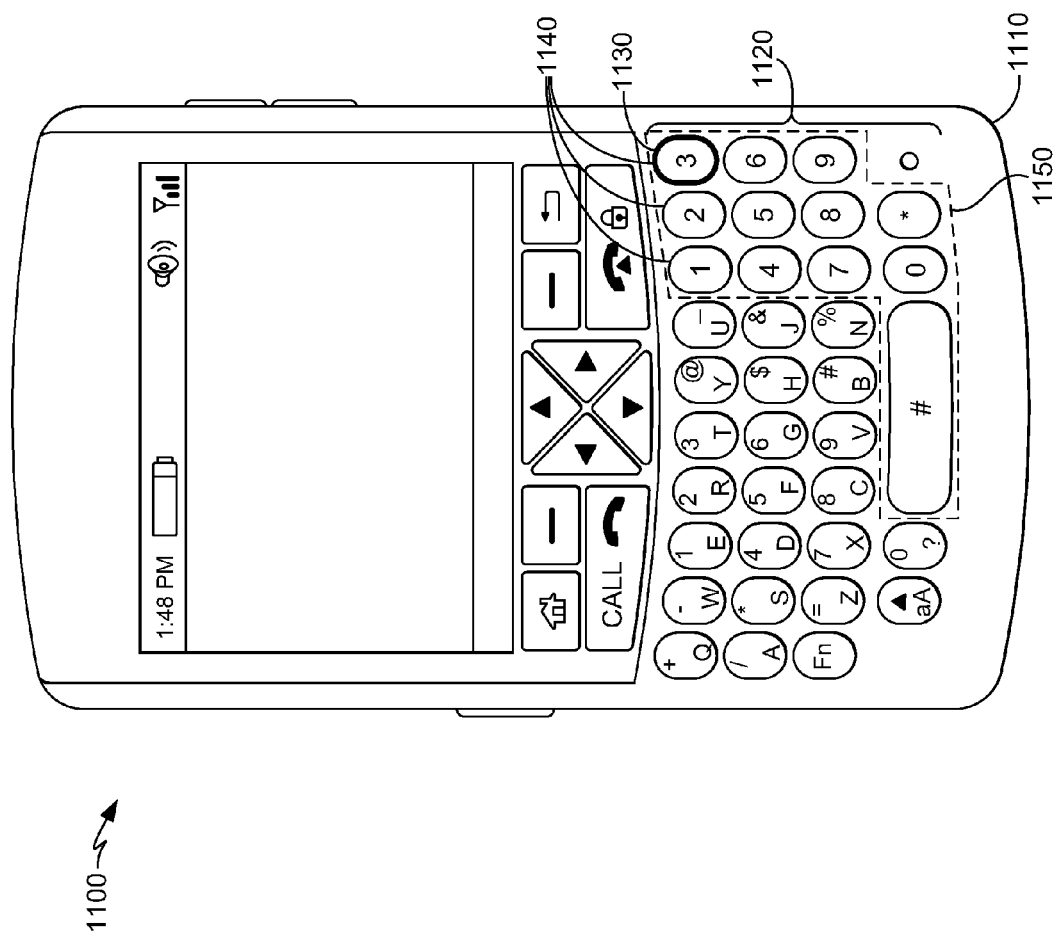
FIG. 11 illustrates a four-row mapping of a portion of keyboard keys to a numerical keypad of a mobile device based on an initially selected right edge key, in accordance with embodiments of the present invention.

FIG. 11 illustrates a four-row mapping 1100 of a portion of keyboard keys 1120 of a mobile device 1110 to a numerical keypad 1150 based on an initially selected right edge key 1130, in accordance with embodiments of the present invention. Numerical keypad 1150 comprises Arabic numerals "0"-"9", a pound key, and a star key arranged in a 4×3 matrix. Initially selected right edge key 1130 is mapped to a right edge key of numerical keypad 1150. In particular, right edge key 1130 is mapped to reference key "3." Further, keyboard keys 1140 within proximity to right edge key 1130 may be mapped to numerical reference keys corresponding to numerical keypad 1150 based on a position of right edge key 1130.

Figure 12:
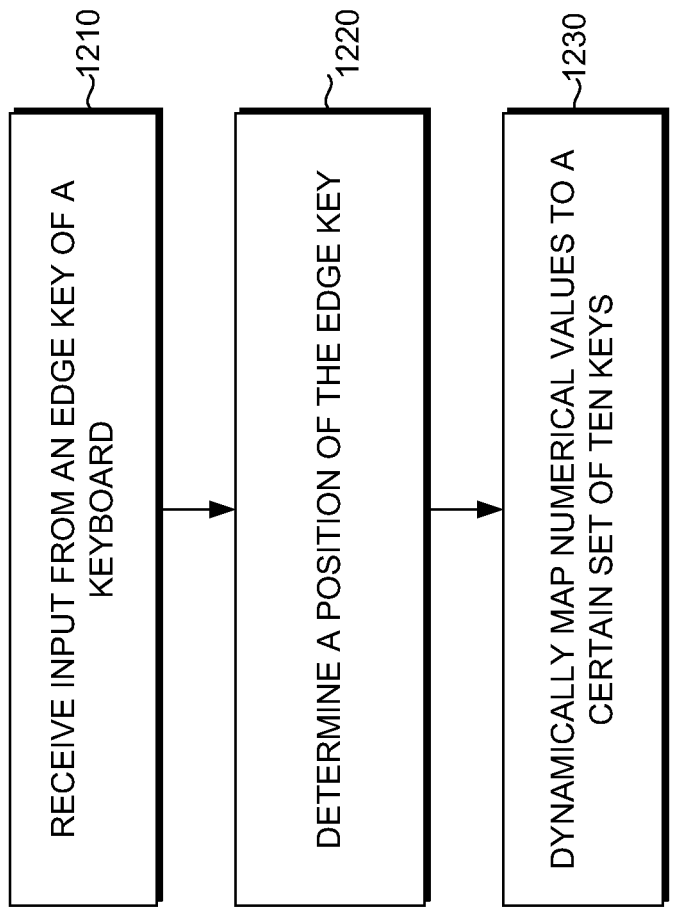
FIG. 12 illustrates a flow diagram of a method of mapping a numerical keypad to keys of a keyboard on a mobile communications device based on an initial selection of an edge key, in accordance with embodiments of the present invention.

FIG. 12 illustrates a flow diagram 1200 of a method of mapping numerical values to keys of a keyboard on a mobile communications device, in accordance with embodiments of the present invention. At step 1210, input from an edge key of the keyboard is received. The edge key is one of a set of keys that define a perimeter of the keyboard. Additionally, the edge key was associated with a first value prior to receiving the input. At step 1220, a position of the edge key is determined. The position of the edge key may be determined based on proximity of the edge key to remaining keys of the keyboard.

At step 1230, numerical values "0" through "9" are dynamically mapped to respectively correspond to a certain set of ten keys based on the determining a position of the edge key. In particular, numerical values "1" through "9" are mapped to nine keys arranged in a 3×3 matrix. Additionally, a middle key within the 3×3 matrix is mapped to the numerical value "5" and is surrounded by remaining keys of the 3×3 matrix that are sequentially mapped to values "1" through "9." Further, the edge key continues to be an edge key. Accordingly, the edge key is configured to be associated with a second value.

Figure 13:
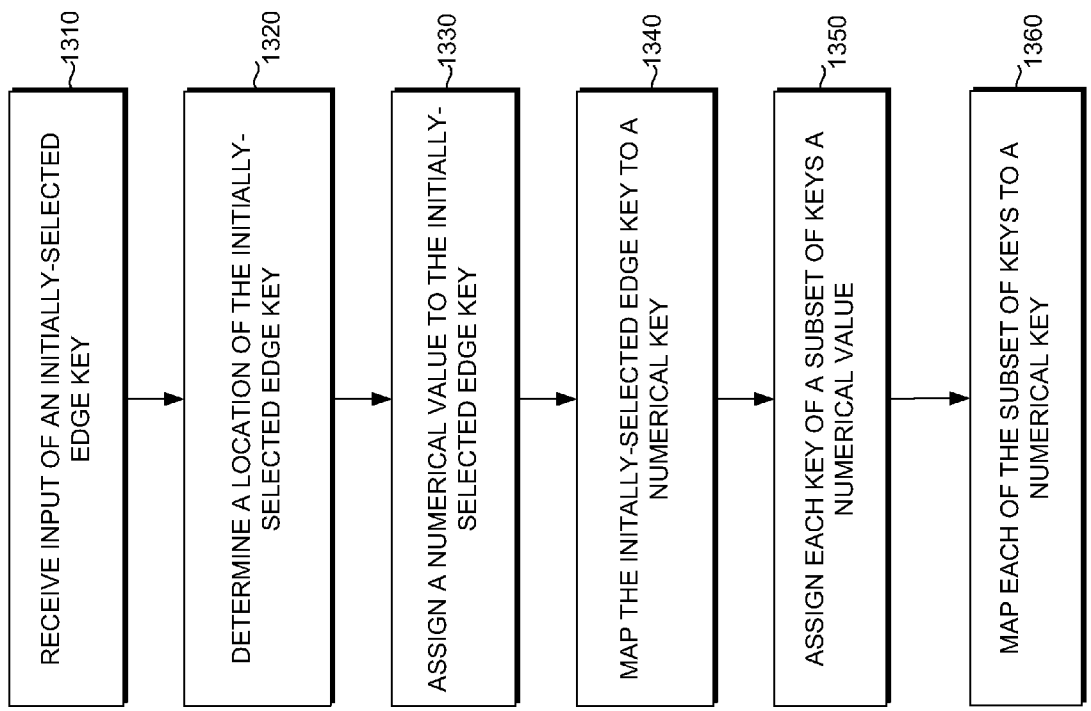
FIG. 13 illustrates another flow diagram of a method of mapping a numerical keypad to keys of a keyboard on a mobile communications device based on an initial selection of an edge key, in accordance with embodiments of the present invention.

FIG. 13 illustrates another flow diagram 1300 of a method of mapping numerical values to keys of a keyboard on a mobile communications device, in accordance with embodiments of the present invention. At step 1310, input comprising an initially selected edge key is received. At step 1330, a numerical value is assigned to the initially selected edge key.

In particular, the numerical value may be associated with a key of the numerical keypad. The numerical keypad may comprise a set of nine numerical keys arranged in a 3×3 matrix. Alternatively, the numerical keypad may comprise a set of ten numerical keys, a pound key, and a star key arranged in a 4×3 matrix. At step 1320, a position of the initially selected edge key is determined.

The numerical value assigned to the initially selected edge key may be based on availability of remaining keys of the keyboard within proximity of the position of the initially selected edge key of the keyboard. Additionally, keys of the keyboard within proximity of the position of the initially selected key of the keyboard may be within two rows and two columns of the initially selected edge key. Further, proximity may be based on magnitude of a matrix comprising the numerical keypad. An available key of a keyboard may comprise a key of a keyboard that is not mapped to a numerical value of the numerical keyboard. At step 1340, the initially selected edge key is mapped to a numerical value of a key of the numerical keypad. At step 1350, each key of a subset of keys is assigned a numerical value. At step 1360, each of the subset of keys is mapped to a numerical value of a key of the numerical keypad.

Figure 14:
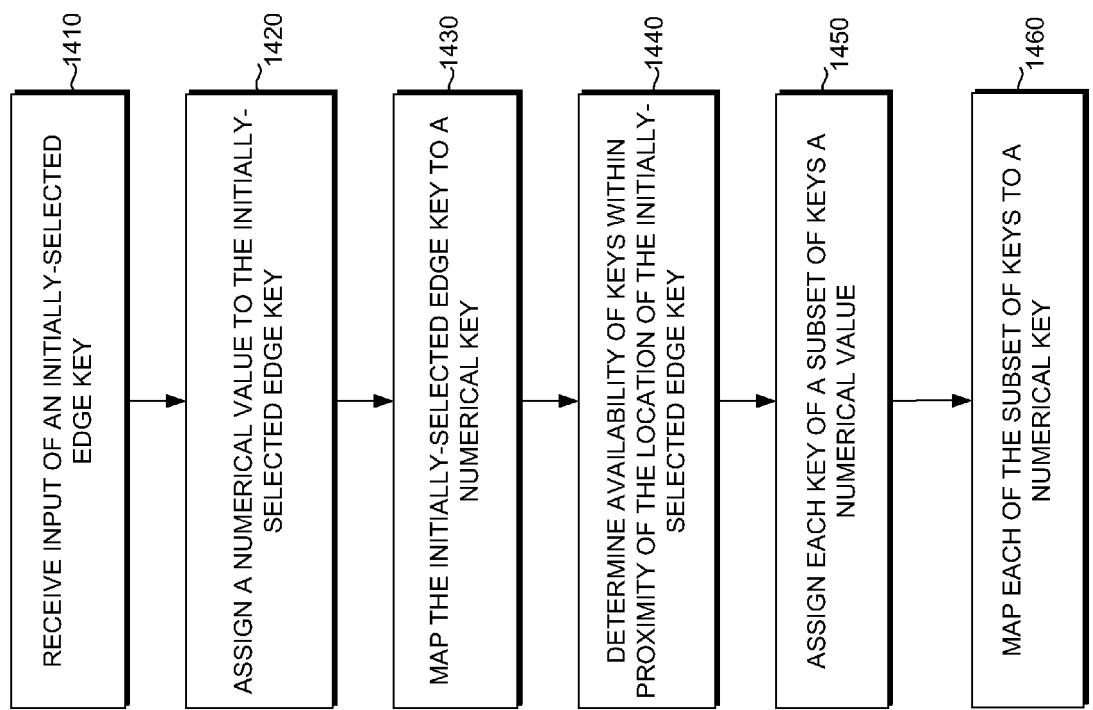
FIG. 14 illustrates a further flow diagram of a method of mapping a numerical keypad to keys of a keyboard on a mobile communications device based on an initial selection of an edge key, in accordance with embodiments of the present invention.

FIG. 14 illustrates a further flow diagram 1400 of a method of mapping numerical values to keys of a keyboard on a mobile communications device, in accordance with embodiments of the present invention. At step 1410, input comprising an initially selected edge key is received. At step 1430, the initially selected edge key is mapped to a numerical value of an edge key of a numerical keypad. The numerical keypad may comprise a set of nine numerical keys arranged in a 3×3 matrix. Alternatively, the numerical keypad may comprise a set of ten numerical keys, a pound key, and a star key arranged in a 4×3 matrix. At step 1420, a numerical value is assigned to the initially selected edge key.

The edge key of the numerical keypad that corresponds to the initially selected edge key may have the same orientation of the initially selected edge key. Further, a numerical value of an edge key of the numerical keypad having a higher value may be mapped to the initially selected edge key when more than one edge key of the numerical keypad has the same orientation as the initially selected edge key. Alternatively, a numerical value of an edge key of the numerical keypad having a lower value may be mapped to the initially selected edge key when more than one edge key of the numerical keypad has the same orientation as the initially selected edge key. At step 1440, availability of keys within proximity of a position of the initially selected edge key is determined. Proximity may be based on a magnitude of a matrix comprising the numerical keypad. At step 1450, each key of a subset of keys is assigned a numerical value. At step 1460, each of the subset of keys is mapped to a numerical value of a key of the numerical keypad.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media ("media") having computer-executable instructions embodied thereon that, when executed, facilitate a method of mapping numerical values to keys of a keyboard of a mobile communications device, the method comprising:
   receiving input from an edge key of the keyboard,
   wherein the edge key is one of a set of keys that define a perimeter of the keyboard, and
   wherein the edge key was associated with a first value prior to receiving the input;
   determining a position of the edge key;
   based on the determining, dynamically mapping numerical values "0" through "9" to respectively correspond to a certain set of ten keys that is characterized as follows,
   numerical values "1" through "9" are mapped to nine keys arranged in a 3×3 matrix,
   a middle key within the 3×3 matrix is mapped to the numerical value "5" and is surrounded by remaining keys of the 3×3 matrix that are sequentially mapped to values "1" through "9," and
   the edge key continues to be an edge key,
   thereby configuring the edge key to be associated with a second value.

2. The media of claim 1, wherein the first value matches the second value.

3. The media of claim 1, wherein the first value is an alphanumeric value.

4. The media of claim 1, wherein an edge key of the 3×3 matrix that corresponds to the edge key of the keyboard has the same orientation of the initially selected edge key.

5. The media of claim 4, wherein a numerical value having a higher value is mapped to the input edge key of the keyboard when more than one edge key of the 3×3 matrix has the same orientation as the input edge key of the keyboard.

6. The media of claim 4, wherein a numerical value having a lower value is mapped to the input edge key of the keyboard when more than one edge key of the 3×3 matrix has the same orientation as the input edge key of the keyboard.

7. Non-transitory computer-readable media ("media") having computer-executable instructions embodied thereon that, when executed, facilitate a method of mapping numerical values to keys of a keyboard on a mobile communications device based on an initial selection of an edge key, the method comprising:
   receiving input comprising an initially selected edge key of the keyboard;
   determining a position of the initially selected edge key of the keyboard along a perimeter of the keyboard;
   assigning a numerical value to the initially selected edge key of the keyboard based on the position of the initially selected edge key on the keyboard;
   mapping the initially selected edge key of the keyboard to a numerical value of an edge key of a numerical keypad that corresponds to the assigned numerical value of the initially selected edge key;
   assigning each key of a subset of keys of the keyboard a numerical value based on the position of the initially selected edge key; and
   mapping each of the subset of keys of the keyboard to a numerical value of a key of the numerical keypad that corresponds to each assigned numerical value of the subset of keys of the keyboard.

8. The media of claim 7, wherein the numerical value assigned to the initially selected edge key is based on availability of remaining keys of the keyboard within proximity of the position of the initially selected edge key of the keyboard.

9. The media of claim 8, wherein keys of the keyboard within proximity of the position of the initially selected key of the keyboard are within two rows and two columns of the initially selected edge key.

10. The media of claim 8, wherein proximity is based on magnitude of a matrix comprising the numerical keypad.

11. The media of claim 8, wherein an available key of a keyboard comprises a key of a keyboard that is not mapped to a numerical value of the numerical keyboard.

12. The media of claim 7, wherein the numerical keypad comprises a set of nine numerical keys arranged in a 3×3 matrix.

13. The media of claim 7, wherein the numerical keypad comprises a set of ten numerical keys, a pound key, and a star key arranged in a 4×3 matrix.

14. Non-transitory computer-readable media ("media") having computer-executable instructions embodied thereon that, when executed, facilitate a method of mapping numerical values to keys of a keyboard on a mobile communications device, the method comprising:
  receiving input comprising an initially selected edge key of the keyboard;
  assigning a numerical value to the initially selected edge key of the keyboard based on a position of the initially selected edge key on the keyboard along a perimeter of the keyboard;
  mapping the initially selected edge key of the keyboard to a numerical value of an edge key of the numerical keypad that corresponds to the assigned numerical value of the initially selected edge key;
  determining availability of keys of a keyboard within proximity of the position of the initially selected edge key of the keyboard;
  assigning each key of a subset of keys of the keyboard a numerical value based on the availability of keys of the keyboard; and
  mapping each of the subset of keys of the keyboard to a numerical value of a key of the numerical keypad that corresponds to each assigned numerical value of the subset of keys of the keyboard.

15. The media of claim 14, wherein proximity is based on a magnitude of a matrix comprising the numerical keypad.

16. The media of claim 14, wherein the edge key of the numerical keypad that corresponds to the initially selected edge key has the same orientation of the initially selected edge key.

17. The media of claim 16, wherein a numerical value of an edge key of the numerical keyboard having a higher value is mapped to the initially selected edge key when more than one edge key of the numerical keyboard has the same orientation as the initially selected edge key.

18. The media of claim 16, wherein a numerical value of an edge key of the numerical keyboard having a lower value is mapped to the initially selected edge key when more than one edge key of the numerical keyboard has the same orientation as the initially selected edge key.

19. The media of claim 14, wherein the numerical keypad comprises a set of nine numerical keys arranged in a 3×3 matrix.

20. The media of claim 14, wherein the numerical keypad comprises a set of ten numerical keys, a pound key, and a star key arranged in a 4×3 matrix.

\* \* \* \* \*